United States Patent
Lo et al.

(10) Patent No.: US 11,106,223 B2
(45) Date of Patent: Aug. 31, 2021

(54) APPARATUS AND METHODS FOR LANDING UNMANNED AERIAL VEHICLE

(71) Applicant: GEOSAT Aerospace & Technology, Tainan (TW)

(72) Inventors: Cheng-Fang Lo, Tainan (TW); Yung-Chieh Huang, Tainan (TW); Chien-Ming Shao, Tainan (TW)

(73) Assignee: GEOSAT AEROSPACE & TECHNOLOGY, Tainan (TW)

( * ) Notice: Subject to any disclaimer, the term of this patent is extended or adjusted under 35 U.S.C. 154(b) by 301 days.

(21) Appl. No.: 16/407,627

(22) Filed: May 9, 2019

(65) Prior Publication Data

US 2020/0356113 A1 Nov. 12, 2020

(51) Int. Cl.
*G05D 1/10* (2006.01)
*G05D 1/04* (2006.01)
*G06K 9/00* (2006.01)
*B64C 39/02* (2006.01)
*G01S 17/04* (2020.01)

(52) U.S. Cl.
CPC ............ *G05D 1/102* (2013.01); *B64C 39/024* (2013.01); *G01S 17/04* (2020.01); *G05D 1/042* (2013.01); *G06K 9/00355* (2013.01); *B64C 2201/127* (2013.01); *B64C 2201/182* (2013.01)

(58) Field of Classification Search
CPC ..................................................... G05D 1/102
See application file for complete search history.

(56) References Cited

U.S. PATENT DOCUMENTS

| | | | | |
|---|---|---|---|---|
| 9,946,262 | B2 * | 4/2018 | Ansari | G06K 9/00805 |
| 10,139,906 | B1 * | 11/2018 | Bai | G06F 3/017 |
| 10,198,083 | B2 * | 2/2019 | Liu | G06F 3/011 |
| 10,444,852 | B2 * | 10/2019 | Leppanen | G06F 3/011 |
| 10,540,543 | B2 * | 1/2020 | Lehtiniemi | G06F 3/017 |
| 10,935,989 | B2 * | 3/2021 | Smits | G01S 17/06 |
| 2010/0305857 | A1 * | 12/2010 | Byrne | G06T 7/73 701/301 |
| 2017/0344114 | A1 * | 11/2017 | Osterhout | G06F 3/04815 |
| 2018/0129276 | A1 * | 5/2018 | Nguyen | G09B 9/00 |

FOREIGN PATENT DOCUMENTS

| | | |
|---|---|---|
| CN | 108121350 A | 6/2018 |
| CN | 109196438 A | 1/2019 |

OTHER PUBLICATIONS

Search Report dated May 13, 2020, issued in counterpart Republic of China Patent Application No. 108123801.

* cited by examiner

*Primary Examiner* — Alex C Dunn
(74) *Attorney, Agent, or Firm* — Finnegan, Henderson, Farabow, Garrett & Dunner LLP

(57) ABSTRACT

An unmanned aerial vehicle (UAV) includes one or more processors, and a memory storing instructions. When executed by the one or more processors, the instructions cause the UAV to perform operations including: recognizing a first gesture of a hand; responsive to a recognition of the first gesture, moving the unmanned aerial vehicle to hover above the hand; detecting a distance between the unmanned aerial vehicle and the hand; responsive to a determination that the distance falls in a range, monitoring the hand to recognize a second gesture of the hand; and responsive to a recognition of the second gesture, landing the unmanned aerial vehicle on the hand.

21 Claims, 10 Drawing Sheets

APPARATUS AND METHODS FOR LANDING UNMANNED AERIAL VEHICLE

TECHNICAL FIELD

The present disclosure relates to unmanned aerial vehicles (UAVs), and more particularly, to apparatuses and methods for landing unmanned aerial vehicles.

BACKGROUND

A user generally achieves launching and landing of unmanned aerial vehicles (UAVs) by controlling the UAV with a remote controller. A traditional landing operation is a manual process, and the user needs to participate in the entire landing process to control the UAV with the remote controller. The landing operation heavily relies on user's operational capability and requires significant learning and training to achieve a safe and successful landing of the UAV.

In addition, ground condition may not always be suitable for landing. For example, there may be soil, mud, rocks, or water that may harm the UAV on the ground, the ground may uneven or not safe to perform a landing. These conditions result in difficulties in the UAV landing process. Accordingly, there is a need to simplify and improve the landing operation of UAVs, in order to overcome the shortcoming set forth above and to provide a better user experience.

SUMMARY

The present disclosure provides a non-transitory computer-readable medium storing a set of instructions executable by a processor of an unmanned aerial vehicle to cause the unmanned aerial vehicle to perform a method for landing the unmanned aerial vehicle. The method for landing the unmanned aerial vehicle includes recognizing a first gesture of a hand; responsive to a recognition of the first gesture, moving the unmanned aerial vehicle to hover above the hand; detecting a distance between the unmanned aerial vehicle and the hand; responsive to a determination that the distance falls in a range, monitoring the hand to recognize a second gesture of the hand; and responsive to a recognition of the second gesture, landing the unmanned aerial vehicle on the hand.

The present disclosure also provides a method for landing the unmanned aerial vehicle. The method for landing the unmanned aerial vehicle includes recognizing a first gesture of a hand; responsive to a recognition of the first gesture, moving the unmanned aerial vehicle to hover above the hand; detecting a distance between the unmanned aerial vehicle and the hand; responsive to a determination that the distance falls in a range, monitoring the hand to recognize a second gesture of the hand; and responsive to a recognition of the second gesture, landing the unmanned aerial vehicle on the hand.

The present disclosure further provides an unmanned aerial vehicle (UAV) includes one or more processors, and a memory storing instructions. When executed by the one or more processors, the instructions cause the unmanned aerial vehicle to perform operations including: recognizing a first gesture of a hand; responsive to a recognition of the first gesture, moving the unmanned aerial vehicle to hover above the hand; detecting a distance between the unmanned aerial vehicle and the hand; responsive to a determination that the distance falls in a range, monitoring the hand to recognize a second gesture of the hand; and responsive to a recognition of the second gesture, landing the unmanned aerial vehicle on the hand.

It is to be understood that the foregoing general description and the following detailed description are exemplary and explanatory only, and are not restrictive of the disclosure, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1A:
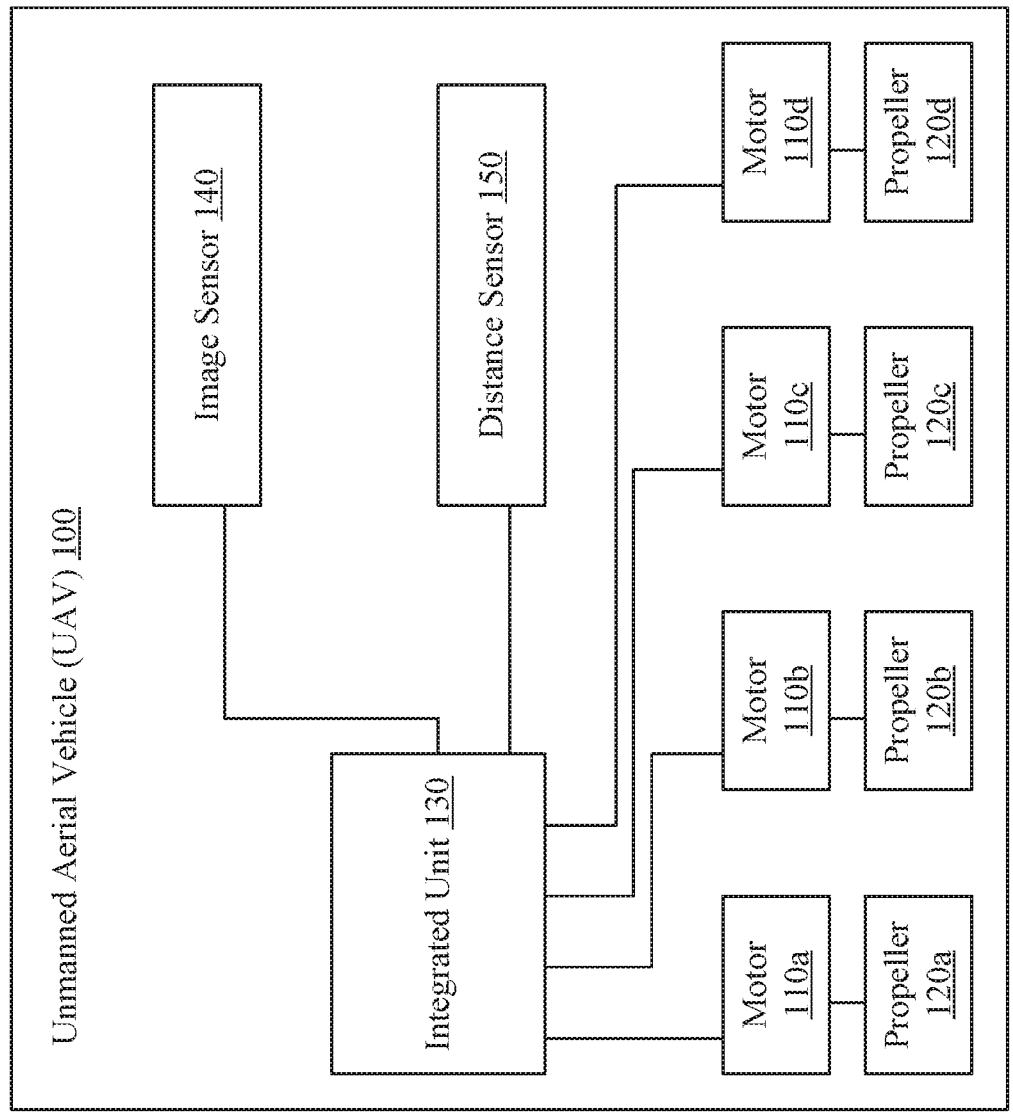
FIG. 1A is a diagram which illustrates an exemplary unmanned aerial vehicle (UAV), consistent with some embodiments of the present disclosure.

FIG. 1A is a diagram which illustrates an exemplary unmanned aerial vehicle (UAV) 100, consistent with some embodiments of the present disclosure. UAV 100 includes one or more motors 110a-110d, one or more propellers 120a-120d, an integrated unit 130, an image sensor 140, and a distance sensor 150. In some embodiments, UAV 100 may also include ailerons for generating a rolling motion to enable UAV 100 to pitch, roll, or yaw. Motors 110a-110d are coupled to propellers 120a-120d respectively and are configured to provide propulsion to UAV 100. In various embodiments, number of motors 110a-110d and propellers 120a-120d may be different, and UAV 100 illustrated in FIG. 1A is merely an example and not meant to limit the present disclosure. For example, UAV 100 may have one, two, three, four, five, six, seven, eight, or any number of motors coupled with propellers respectively.

Integrated unit 130 is communicatively coupled to motors 110a-110d and configured to control motors 110a-110d to provide lift and propulsion in various flight operations, such as ascending, descending, approximate hovering, or transiting. For example, integrated unit 130 may be configured to transmit driving signals to drive motors 110a-110d, respectively, to control rotational speed of motors 110a-110d.

Image sensor 140 is communicatively coupled to integrated unit 130 and configured to capture one or more images. More particularly, image sensor 140 is configured to convert optical signals into electrical signals that contain information of captured images, and to transmit the converted electrical signals to integrated unit 130 for image processing and recognition. In some embodiments, image sensor 140 may include a CMOS image sensor, such as a visible light CMOS image sensor, but the present disclosure is not limited thereto.

Distance sensor 150 is communicatively coupled to integrated unit 130 and configured to detect a distance between UAV 100 and an obstacle or an object in the vicinity of UAV 100. Distance sensor 150 may be implemented by a laser proximity sensor, which can detect objects or obstacles by emitting laser beams and detecting corresponding laser beams reflected from the obstacle or the object. Wavelengths of the laser beams emitted by distance sensor 150 may be chosen based on practical design. For example, distance sensor 150 may emit visible laser beams, but the present disclosure is not limited thereto.

Figure 1B:
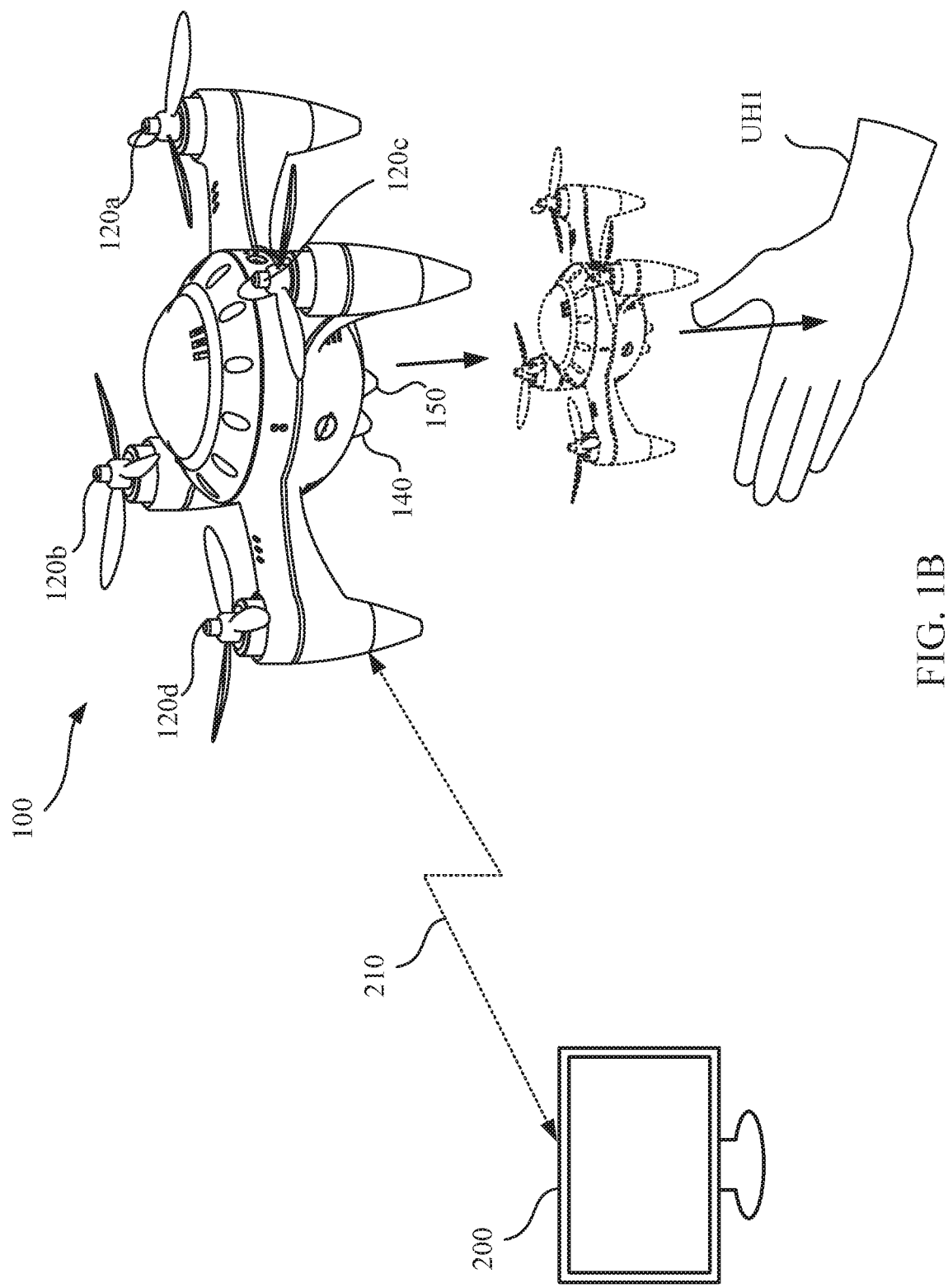
FIG. 1B is a diagram which illustrates an exemplary UAV and an exemplary control system, consistent with some embodiments of the present disclosure.

FIG. 1B is a diagram which illustrates UAV 100 and an exemplary control system 200, consistent with some embodiments of the present disclosure. A user may control UAV 100 to perform flight operations and set one or more operating parameters of UAV 100 through control system 200. For example, control system 200 may include a ground control station (GCS) or a remote controller. In some embodiments, the GCS can be run on a desktop computer, a laptop, a tablet, a smartphone, or any other electronic device. The user can input one or more instructions to control system 200. After receiving the instruction, control system 200 may transmit a communication signal 210 through a communication circuit to UAV 100.

As shown in FIG. 1B, in some embodiments, image sensor 140 is arranged at a bottom side of UAV 100 (e.g., the side facing towards the ground when UAV 100 hovers). As a result, image sensor 140 is able to capture images and obtain information about one or more objects underneath UAV 100, such as size, shape, or color of the object(s). Similar to image sensor 140, in some embodiments, distance sensor 150 is also arranged at the bottom side of UAV 100. As a result, distance sensor 150 is able to detect the distance between UAV 100 and the object(s) underneath UAV 100, or the distance between UAV 100 and the ground.

When UAV 100 receives a hand landing instruction from control system 200, a hand landing mode for UAV 100 is triggered. During the hand landing mode, UAV 100 can land on a user hand UH1 if the user hand UH1 is recognized, an operation facilitated by images captured by image sensor 140 and distance detected by distance sensor 150. Details of operations in the hand landing mode will be discussed in detail below.

Figure 2:
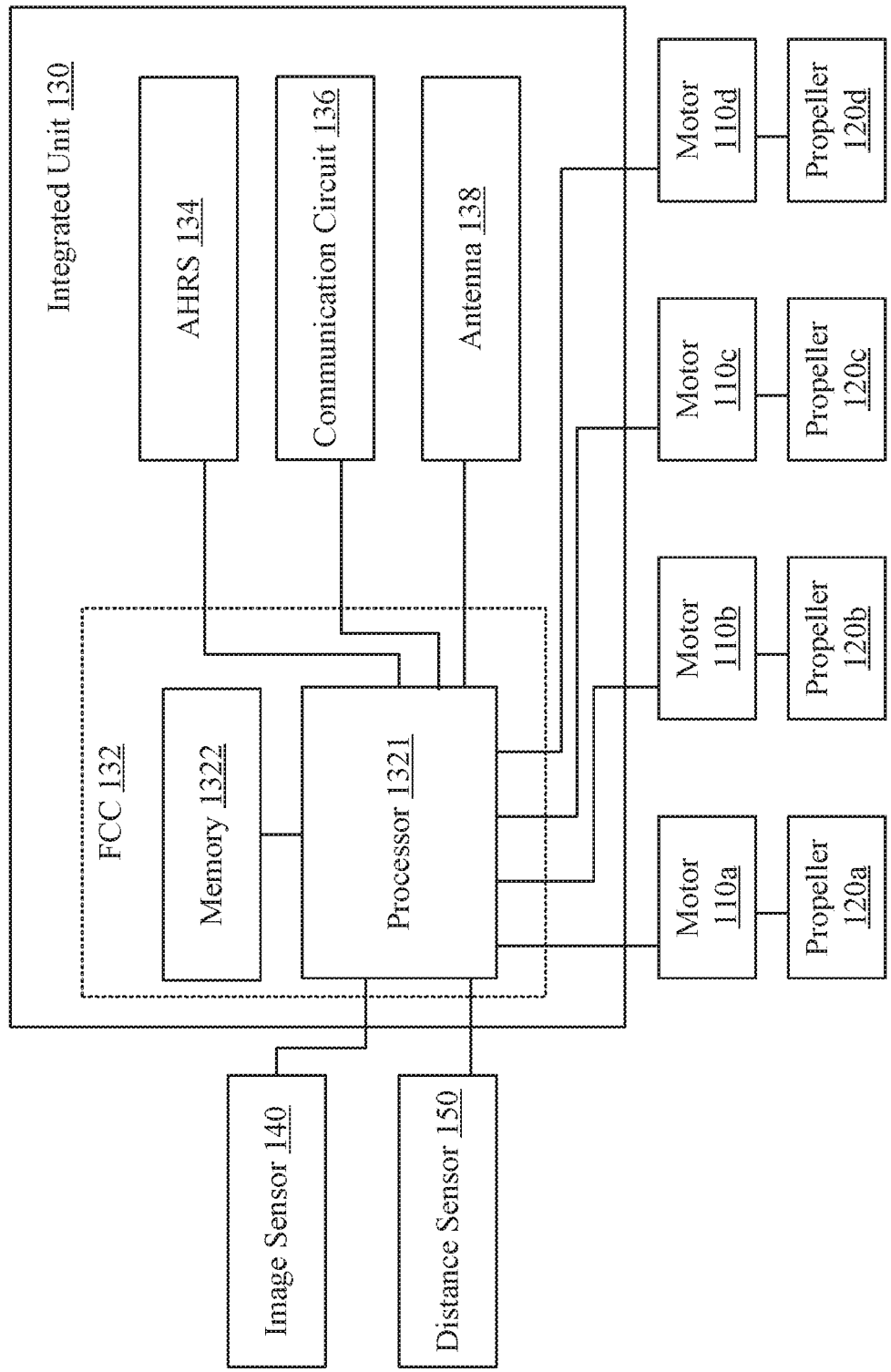
FIG. 2 is a diagram which illustrates an exemplary integrated unit, consistent with some embodiments of the present disclosure.

FIG. 2 is a diagram which illustrates an exemplary integrated unit 130, consistent with some embodiments of the present disclosure. As shown in FIG. 2, in some embodiments, integrated unit 130 includes a flight control computer (FCC) 132, an attitude and heading reference system (AHRS) 134, a communication circuit 136, and an antenna 138, all for controlling UAV 100.

FCC 132 includes a processor 1321 and a memory 1322 storing instructions and configured to control UAV 100. For example, FCC 132 may be configured to control motor(s) 110a-110d to speed up or slow down UAV 100. In some embodiments, FCC 132 may increase or decrease a rotational speed of one or more of motors 110a-110d. For example, integrated unit 130 can independently control revolutions per minute (RPM) of each of motors 110a-110d during the flight.

More particularly, memory 1322 can store data and/or software instructions executed by processor 1321 to perform operations consistent with the disclosed embodiments. For example, processor 1321 can be configured to execute a set of instructions stored in memory 1322 to cause UAV 100 to perform a method for landing UAV 100 on a human hand, such as a hand of a user, automatically when receiving a landing instruction from the user, which is discussed in detail below.

Processors 1321 can be, for example, one or more central processors or microprocessors. Memory 1322 can be various computer-readable media implemented in any method or technology for storage of information such as computer-readable instructions, data structures, program modules, or other data. Memory 1322 can be communicatively coupled with processor(s) 1321 via a bus. In some embodiments, memory 1322 may include a main memory, which can be used for storing temporary variables or other intermediate information during execution of instructions by processor 1321. Such instructions, after being stored in non-transitory storage media accessible to integrated unit 130, enable UAV 100 to perform operations specified in the instructions.

The term "non-transitory media" as used herein refers to any non-transitory media storing data or instructions that cause a machine to operate in a specific fashion. Such non-transitory media can include non-volatile media and/or volatile media. Non-transitory media include, for example, optical or magnetic disks, dynamic memory, a floppy disk, a flexible disk, hard disk, solid state drive, magnetic cassettes, magnetic tape, or any other magnetic data storage medium, a CD-ROM, digital versatile disks (DVD) or any other optical data storage medium, a Random Access Memory (RAM), a read-only memory (ROM), a Programmable Read-Only Memory (PROM), a EPROM, a FLASH-EPROM, NVRAM, flash memory, or other memory technology and/or any other storage medium with the same functionality that can be contemplated by persons of ordinary skill in the art to which this disclosure pertains. Other components known to one of ordinary skill in the art may be included in UAV 100 to process, transmit, provide, and receive information consistent with the disclosed embodiments. AHRS 134 includes one or more sensors on three axes that provide attitude information, such as a roll angle, a pitch angle, and/or a yaw angle, of UAV 100. The sensors of AHRS 134 may also be referred to as magnetic, angular rate, and gravity (MARG) sensors, and include either solid-state or microelectromechanical systems (MEMS) gyroscopes, accelerometers, and magnetometers. AHRS 134 may include an on-board processing system which provides attitude and heading information. In some embodiments, AHRS 134 may provide attitude determination of UAV 100, and may also form part of an inertial navigation system of UAV 100.

UAV 100 can transmit data to and communicate with other electronic devices through communication circuit 136 and antenna 138. For example, UAV 100 can receive a communication signal from the control system, e.g., control system 200 in FIG. 1B, by means of communication circuit 136 and antenna 138. In addition, UAV 100 can also communicate with a display device, a server, a computer system, a datacenter, or other UAVs by means of communication circuit 136 and antenna 138 via radio frequency (RF) signals or any type of wireless network.

Figure 3:
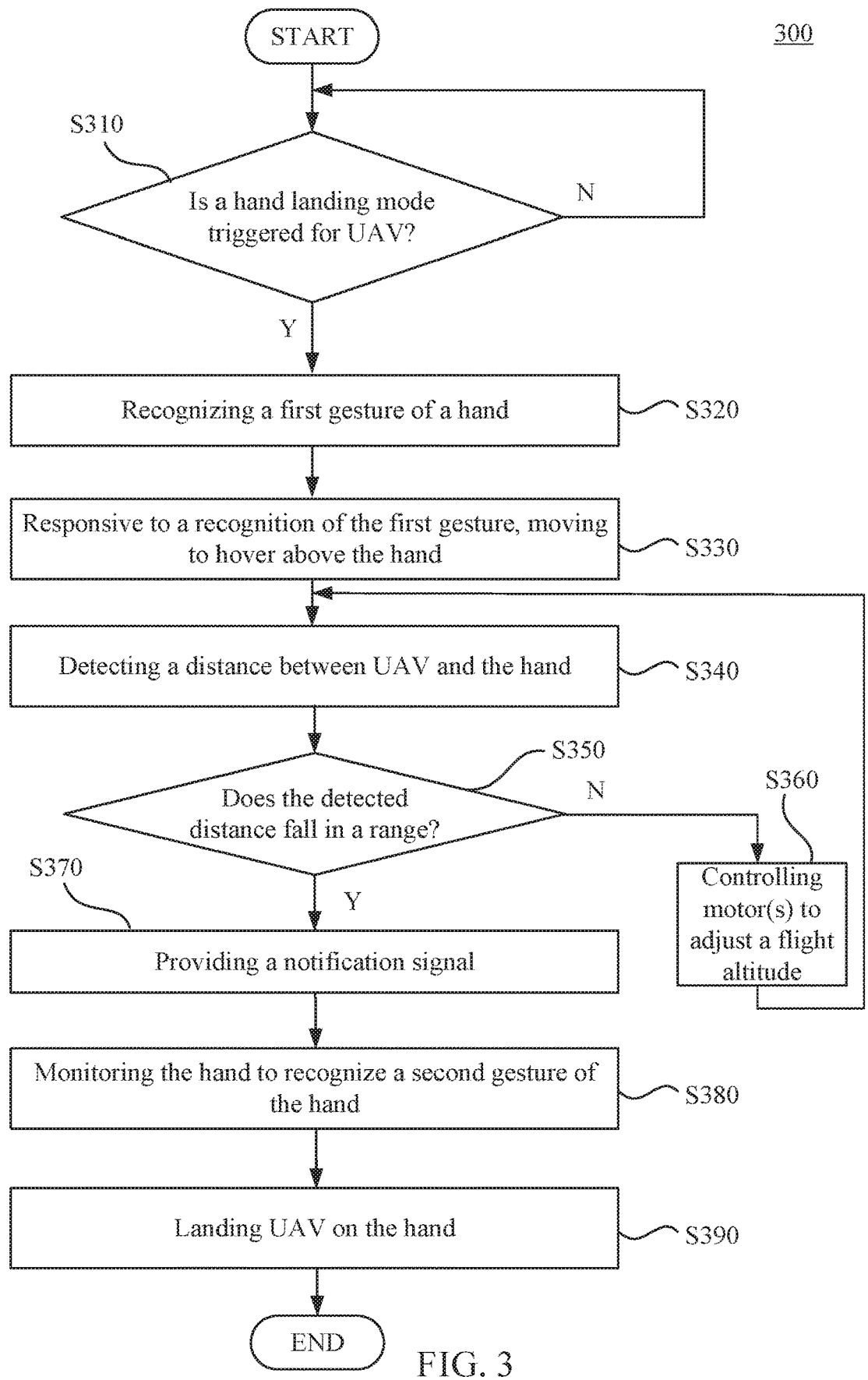
FIG. 3 is a flow diagram of an exemplary method for landing a UAV, consistent with some embodiments of the present disclosure.

FIG. 3 is a flow diagram of an exemplary method 300 for landing UAV 100, consistent with some embodiments of the present disclosure. Method 300 can be performed by a UAV (e.g., UAV 100 in FIGS. 1A and 1B), but the present disclosure is not limited thereto. In some embodiments, processor 1321 can be configured to execute instructions stored in memory 1322 to cause UAV 100 to perform steps in method 300 for landing UAV 100.

In step S310, UAV 100 determines whether a hand landing mode is triggered for UAV 100. A user can send a corresponding signal from control system 200 as a hand landing instruction to UAV 100. When processor 1321 receives the hand landing instruction via communication circuit 136, processor 1321 selects and triggers the hand landing mode. Responsive to the selected hand landing mode, UAV 100 hovers at a predetermined altitude at a position in the vicinity of the user. For example, UAV 100 may maintain a hover altitude of any value within a range between about 1 meter and about 2 meters.

In step S320, UAV 100 recognizes a first gesture of a hand. In step S330, responsive to recognition of the first gesture, UAV 100 moves to hover above the hand. For example, when UAV 100 hovers, the user may extend a hand with open palm facing upward underneath UAV 100. Image sensor 140 can send image information to processor 1321 to perform image processing and recognition to recognize the hand and gesture of the hand (step S320). In some embodiments, the first gesture recognized by UAV 100 may include the hand with closed fingers. In this context, the hand with "closed fingers" refers to the hand gesture in which fingers are adjacent to each other with no gap, which will be discussed in further detail below in conjunction with FIG. 5A. Thus, when UAV 100 recognizes the hand with closed fingers, FCC 132 may control motors 110*a*-110*d* to adjust a position of UAV 100 to hover above the hand (step S330).

Figure 4A:
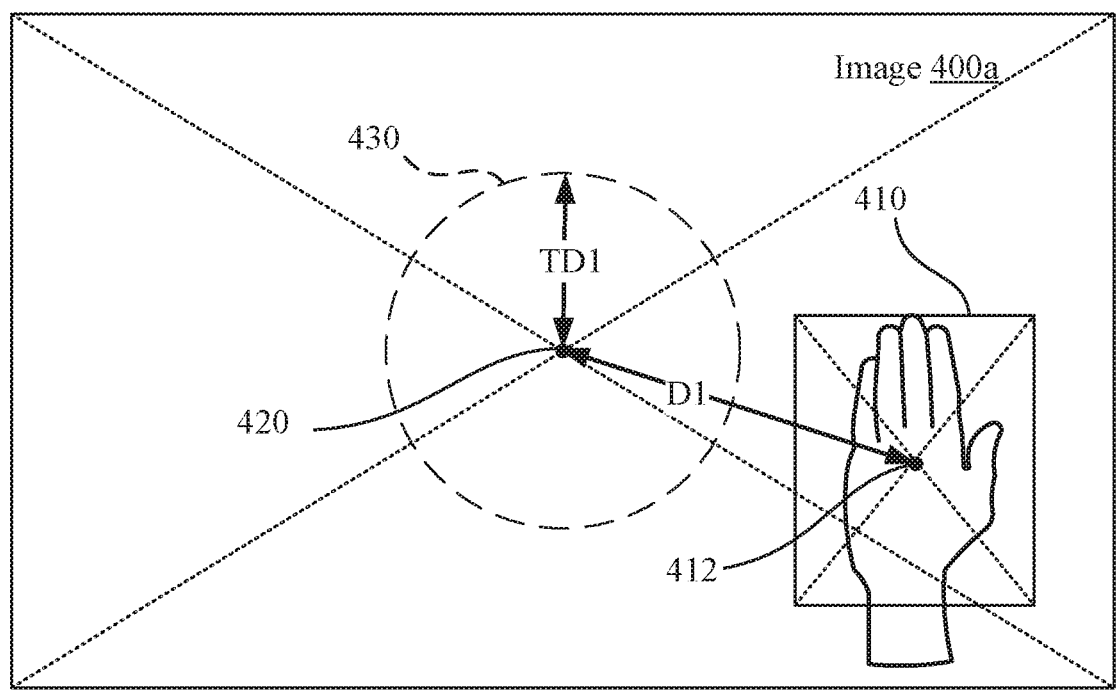
FIG. 4A and FIG. 4B are diagrams illustrating exemplary images captured by an image sensor, consistent with some embodiments of the present disclosure.
Figure 4B:
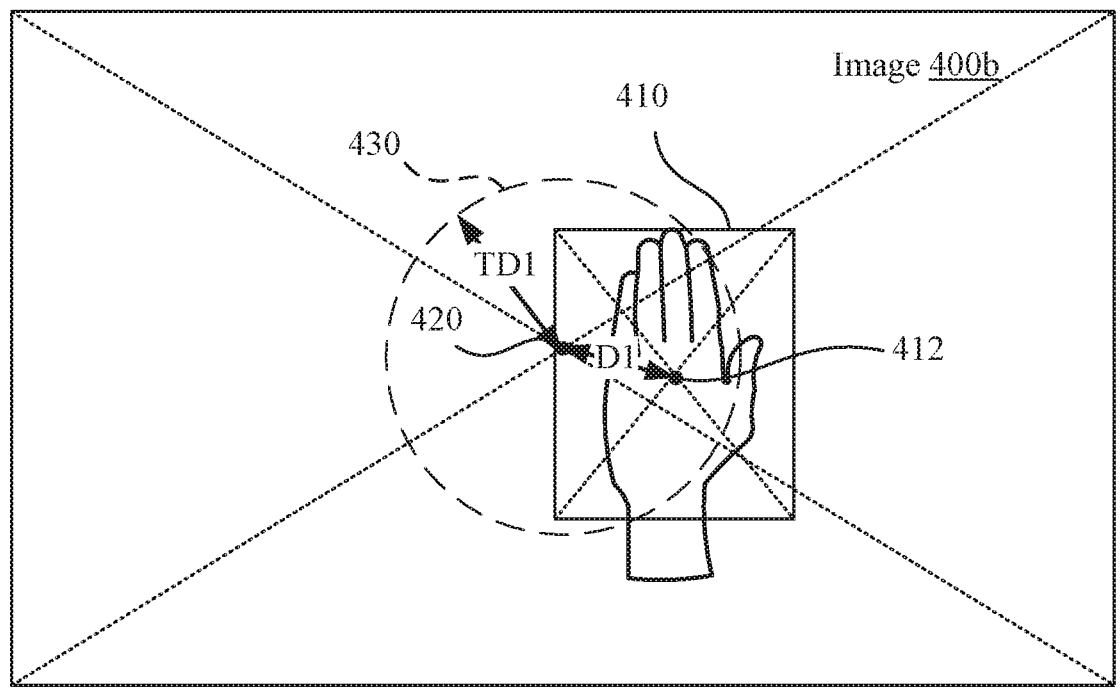

FIG. 4A and FIG. 4B are diagrams illustrating exemplary images 400*a* and 400*b*, respectively, captured by image sensor 140, consistent with some embodiments of the present disclosure. As shown in FIG. 4A, by performing a hand detection and tracking algorithm, UAV 100 can identify a hand region 410 with a center point 412 in image 400*a*. For example, hand region 410 may be identified based on color information in image 400*a*. One or more candidate regions having a skin tone color may be selected. Then, shapes and sizes of the one or more candidate regions are further analyzed to determine whether hand region 410 corresponding to a human hand exists. In some embodiments, hand region 410 is a rectangular region, as shown in FIGS. 4A and 4B. UAV 100 calculates a distance D1 between center point 412 and a center point 420 of image 400*a* to determine whether the hand falls within a central region 430 of image 400*a*.

In some embodiments, central region 430 can be defined as a set of pixels, in which the distance between the pixels and center point 420 is within a threshold distance TD1, but the present disclosure is not limited thereto. If distance D1 between center point 412 and center point 420 is greater than threshold distance TD1, UAV 100 controls motors 110*a*-110*d* to adjust the position of UAV 100 in a direction determined to move UAV 100 toward center 420, until distance D1 is less than or equal to threshold distance TD1. For example, as shown in FIG. 4A, distance D1 in image 400*a* is greater than threshold distance TD1. As a result, UAV 100 controls motors 110*a*-110*d* to adjust the position of UAV 100 until distance D1 is less than or equal to the threshold distance TD1 as shown in image 400*b* captured by image sensor 140 in FIG. 4B. Central region 430 can also be defined as a region in images 400*a* and 400*b* corresponding to a space below UAV 100 in the physical world. Based on sizes of UAV 100 and different arrangements of image sensor 140, the central region may be set in accordance with actual needs in different embodiments.

Alternatively, UAV 100 may also predefine a range of central region 430 of image 400*a* and 400*b*, and determine whether center point 412 of hand region 410 falls within the range. Similarly, UAV 100 can adjust its position so as to track center point 412 within central region 430. Alternatively stated, UAV 100 can monitor the hand in image 400*a* obtained by image sensor 140, identify a center of the hand in accordance with one or more features of the hand, and move UAV 100 until center point 412 of hand region 410 is tracked in central region 430 of image 400*b*. Thus, UAV 100 can move to hover above the hand.

Returning to FIG. 3, after the hand is tracked in the central region of the image and UAV 100 moves to hover above the hand, in step S340, UAV 100 detects a distance between UAV 100 and the hand. In some embodiments, distance sensor 150 can be applied to measure the distance using a time-of-flight principle. That is, distance sensor 150 can record the time taken for a light pulse to travel to a target object and back. With the speed of light known and a measurement of the time taken, the distance between the distance sensor 150 and the target object can be calculated. Distance sensor 150 can fire multiple light pulses sequentially in order to obtain an average distance value. More particularly, distance sensor 150 can be configured to transmit one or more laser beams along a direction toward the hand and to receive one or more reflections of the one or more laser beams. Thus, UAV 100 can calculate the distance based on a time difference between transmitting the one or more laser beams and receiving the one or more reflections.

In step S350, UAV 100 determines whether the detected distance falls in a predetermined range (e.g., about 10 cm-20 cm). Responsive to a determination that the detected distance falls in the range (step S350—yes), UAV 100 performs step S370. On the other hand, responsive to a determination that the detected distance is above or below the range (step S350—no), UAV 100 performs step S360 and controls motors 110*a*-110*d* to adjust a flight altitude and repeats step S340 and S350. Thus, UAV 100 can hover above the hand with a distance (e.g., about 15 cm) that falls in the range, and continue to perform step S370.

In step S370, UAV 100 provides a notification signal to indicate that UAV 100 is waiting for a command from the user. The notification signal may include a visual signal, an audio signal, or any combination thereof. For example, UAV 100 can emit a specific color of light, a flickering light, or a sequence of light pattern, using one or more light emitting diodes (LEDs) or other illuminating devices as the notification signal. UAV 100 can also use beepers, buzzers, or any other audio output devices to provide a predetermined tone (e.g., a beep or a buzz sound), a sequence of tones or music, or a recorded voice message as the notification signal, but the present disclosure is not limited thereto.

After seeing or hearing the notification signal provided by UAV 100, the user may change the hand gesture from the first gesture to a second gesture different from the first gesture. For example, the user can change the hand position to have at least two fingers parted, in order to trigger the landing operation. That is, the second gesture may include the hand with open fingers. In this context, the hand with "open fingers" refers to a hand gesture in which at least two fingers are separated with a gap, which will be further described below in conjunction with FIG. 5B.

In step S380, UAV 100 monitors the hand and recognizes the second gesture of the hand. Responsive to recognition of the second gesture, UAV 100 performs step S390 and lands on the hand. More particularly, similar to operations in step S320, UAV 100 uses image sensor 140 to send image information to processor 1321 to perform image processing and recognition to monitor the hand and recognize the gesture of the hand. Thus, when identifying a transition from the first gesture to the second gesture, UAV 100 continues following operations to perform the landing.

Figure 5A:
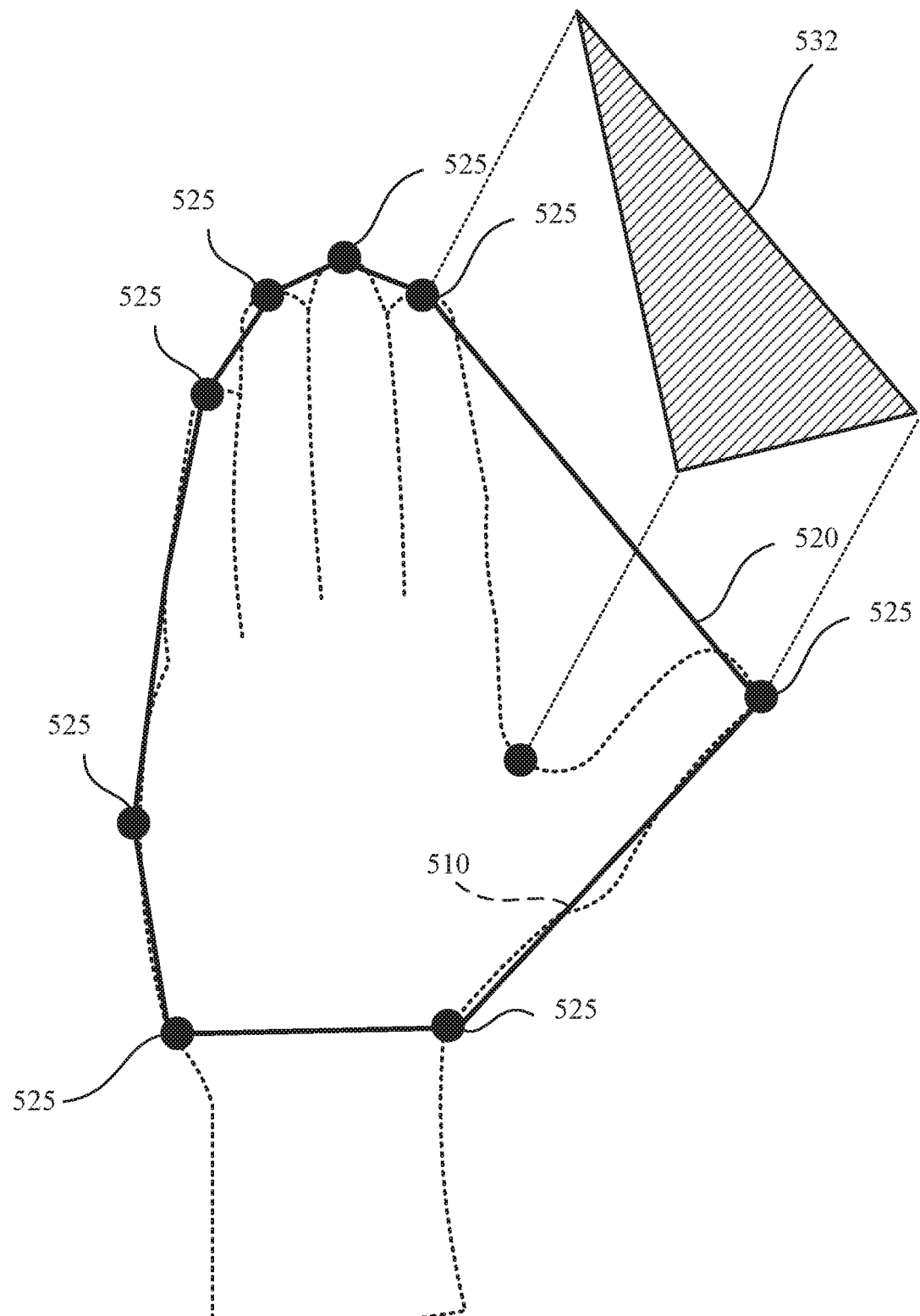
FIG. 5A and FIG. 5B are diagrams illustrating exemplary images captured by the image sensor, consistent with some embodiments of the present disclosure.
Figure 5B:
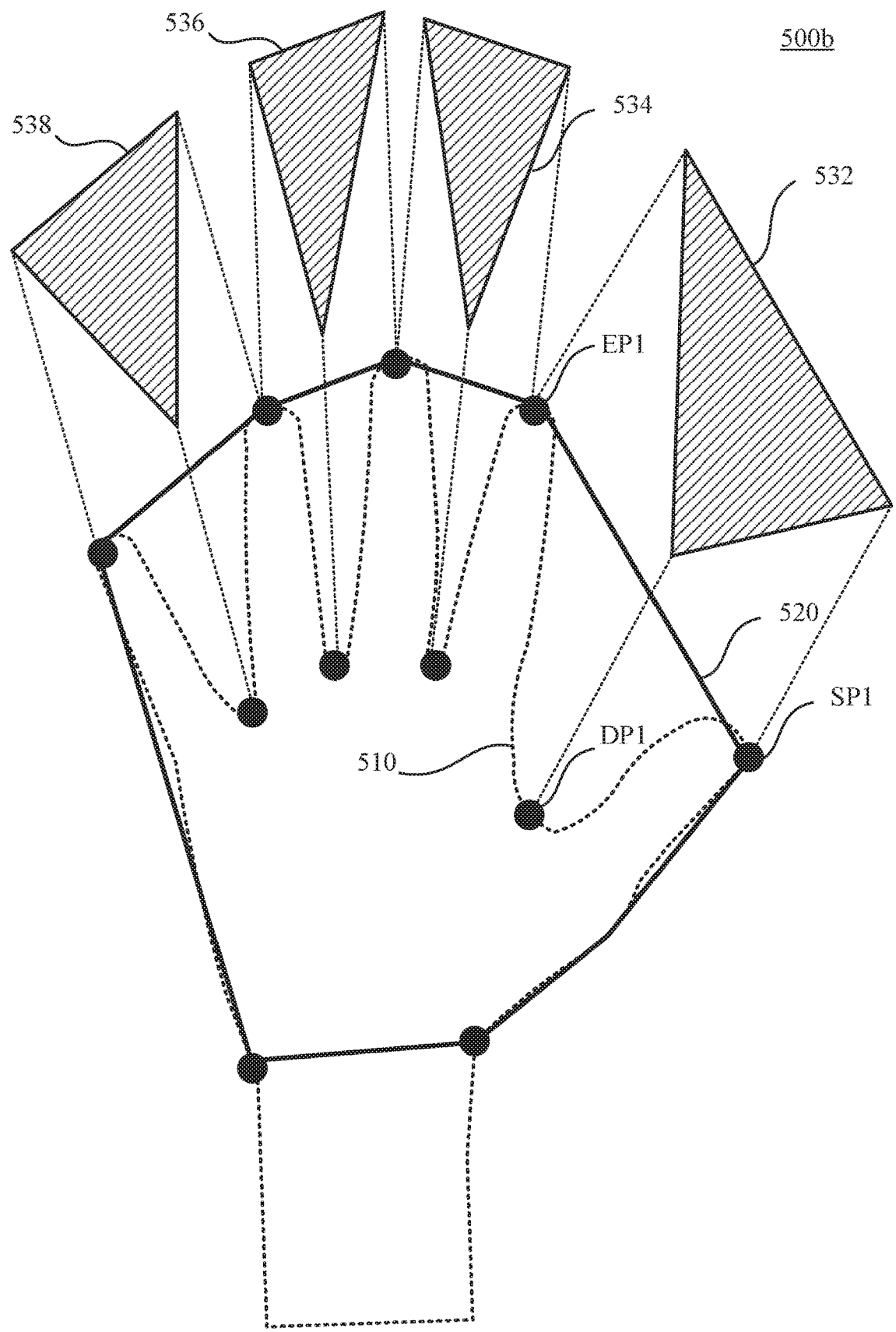

For further understanding of gesture recognition in steps S320 and S380, reference is made to FIG. 5A and FIG. 5B, which are diagrams illustrating exemplary images 500a and 500b, respectively, captured by image sensor 140, consistent with some embodiments of the present disclosure. After image sensor 140 captures image 500a and 500b, processor 1321 can apply various image processing techniques to images 500a and 500b. For example, processor 1321 can perform a skin detection process to capture a skin region of the hand. Processor 1321 can also perform a noise elimination process to reduce or remove noise signals in images 500a and 500b. Thus, processor 1321 can detect a hand contour 510. In some embodiments, processor 1321 can further perform an approximation process to approximate the hand contour 510 with one or more polygons in images 500a and 500b, in which undesired convexity points are removed or filtered in the approximation process.

After hand contour 510 is obtained, processor 1321 can apply a convex hull algorithm and a convexity hull defects algorithm to recognize the hand and the gesture of the hand. More particularly, processor 1321 can find a convex hull 520 of an approximated polygon by applying one of various convex hull algorithms. The term "convex hull" as used herein refers to a convex envelope polygon of a concave polygon (e.g., the approximated polygon associated with hand contour 510), which includes vertices 525 of the concave polygon. After convex hull 520 is defined, processor 1321 can determine whether one or more convexity defects exist.

As shown in FIG. 5A, when four fingers of the user (i.e., all fingers except thumb) are adjacent to each other with no gap, there is one convexity defect 532 (e.g., a purlicue, or space between the thumb and the index finger) within convex hull 520. On the other hand, as shown in FIG. 5B, when the user releases the hand with fingers parted to trigger the landing operation, there are two or more convexity defects 532, 534, 536, and 538. In FIGS. 5A and 5B, convexity defects 532, 534, 536, and 538 are spaced away from the hand contour 510 for purposes of clarity and explanation. Convexity defects 532, 534, 536, 538 may be triangular regions defined by vertex points of the approximated polygon of the hand contour 510. For example, a start point (e.g., start point SP1), a depth point (e.g., depth point DP1), and an end point (e.g., end point EP1) define a convexity defect (e.g., convexity defect 532). The start point SP1 indicates a point of the approximated polygon where the defect begins, the end point EP1 indicates a point of the approximated polygon where the defect ends, and the depth point DP1 is a point of the approximated polygon spaced from convex hull 520. For a hand with open fingers, start points and end points of convexity defects can be finger tips, and depth points of convexity defects can be located at finger-valleys.

Accordingly, UAV 100 can extract hand contour 510 to obtain convexity defects 532, 534, 536, and 538 associated with hand contour 510 in images 500a and 500b. Convexity defects 532, 534, 536, and 538 can be used to indicate spacing between fingers. When a change in relative finger positions or a finger movement occurs, a change in defects 532, 534, 536, and 538 can be detected accordingly. Responsive to a detection that number of convexity defects changes, UAV 100 determines that the second gesture is recognized, and continues to perform step S390 for landing. That is, the user can provide the command and trigger UAV 100 to execute landing by opening the closed fingers, which is intuitive.

Figure 6:
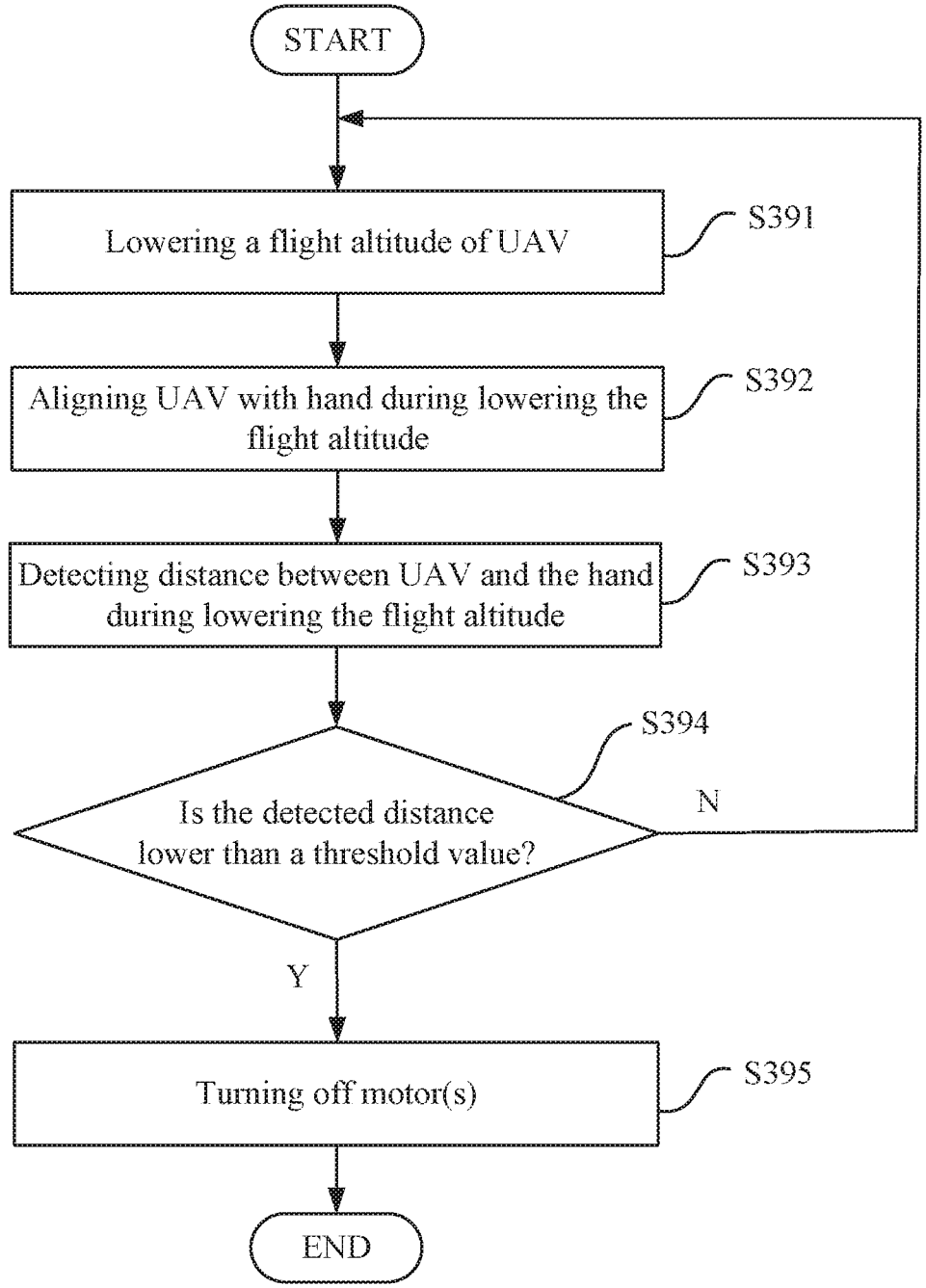
FIG. 6 is a flow diagram illustrating, in greater detail, one step of the exemplary method in FIG. 3, consistent with some embodiments of the present disclosure.

Reference is made to FIG. 6, which is a flow diagram illustrating, in greater detail, step S390 of the exemplary method 300 in FIG. 3, consistent with some embodiments of the present disclosure. In step S391, when the second gesture is recognized, UAV 100 lowers a flight altitude of UAV 100. More particularly, FCC 132 may provide a corresponding control signal to gradually decrease the rotational speed of motors 110a-110d. In step S392, UAV 100 is aligned with the hand while lowering the flight altitude. More particularly, image sensor 140 tracks the hand in the image and identifies a hand center or a palm center in accordance with one or more features of the hand. Accordingly, FCC 132 may provide a corresponding control signal to control motors 110a-110d to move UAV 100 to track the hand center or the palm center in the central region of the image. In some embodiments, features for identifying the center of the hand include at least one triangular area defined by two adjacent finger tips and a gap between the two adjacent fingers.

Figure 7:
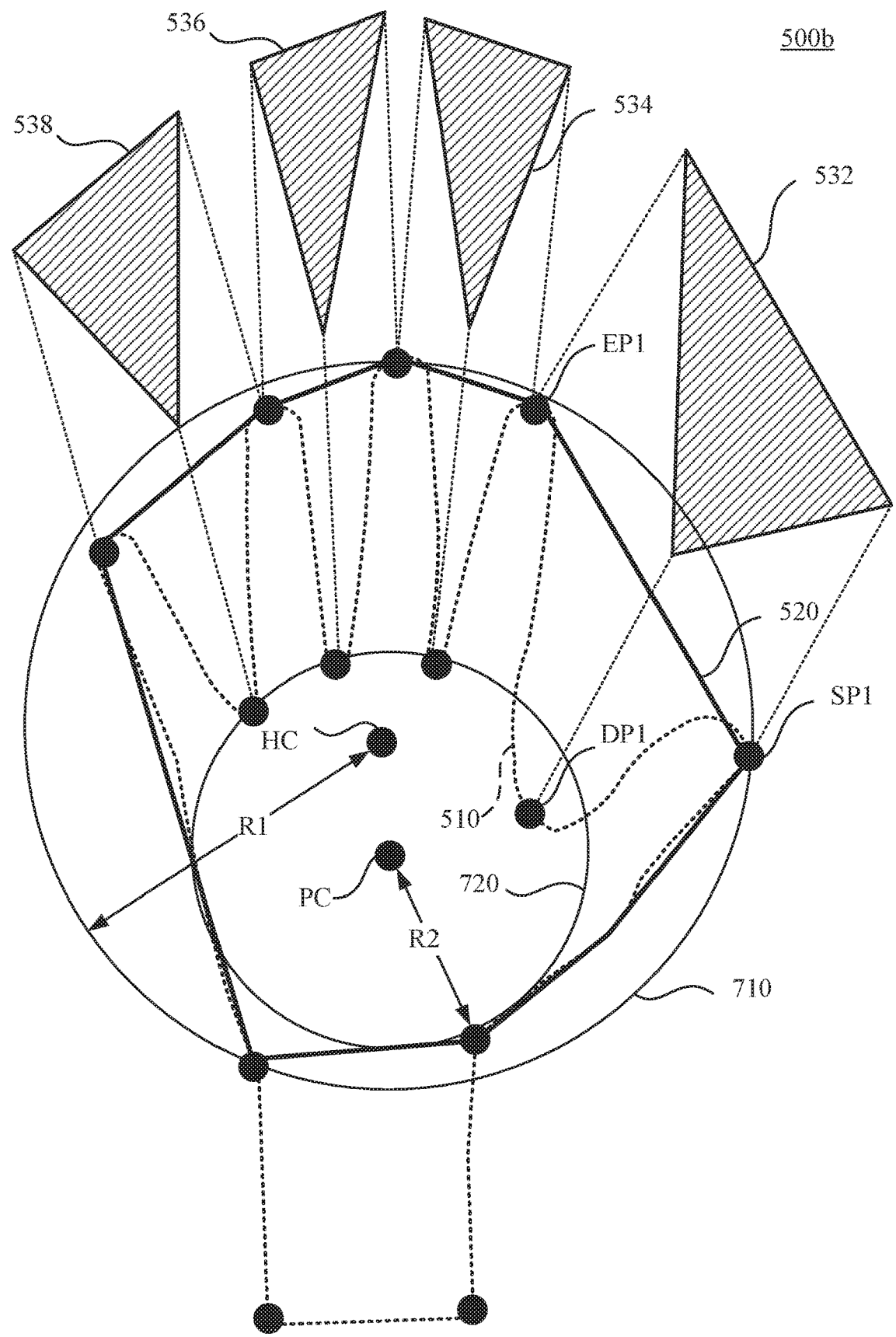
FIG. 7 is a diagram illustrating an image captured by the image sensor, consistent with some embodiments of the present disclosure.

For further understanding of step S392, reference is made to FIG. 7, which is a diagram illustrating image 500b captured by image sensor 140, consistent with some embodiments of the present disclosure. As shown in FIG. 7, processor 1321 can find a minimal circle 710 which can cover convex hull 520, and estimate a hand center HC by the center of minimal circle 710. In some embodiments, processor 1321 may alternatively find a rectangular box which can cover convex hull 520, and estimate hand center HC accordingly. Similarly, processor 1321 can find a minimal circle 720 which can cover the depth points, and estimate a palm center PC by the center of minimal circle 720. In some embodiments, processor 1321 can also record radii R1, R2 of minimal circles 710, 720 for later use.

By applying the image processing techniques mentioned above, processor 1321 can detect hand contour 510 in image 500b, extract hand contour 510 to obtain convex hull 520 and one or more convexity defects 532, 534, 536, 538 including at least one triangular region, and estimate hand center HC or palm center PC in image 500b. The embodiments discussed above are merely examples and not intended to limit the present disclosure. In various embodiments, other image processing techniques may be applied to extract one or more hand features of hand contour 510 in image 500b and to estimate hand center HC or palm center PC accordingly. The hand features may include convex hull 520, and/or convexity defects 532, 534, 536, 538 of hand contour 510.

Thus, during lowering of the flight altitude, FCC 132 can control motors 110a-110d to adjust the position of UAV 100 and to move UAV 100 to track the hand center HC or the palm center PC in the central region of image 500b in FIG.

Figure 8:
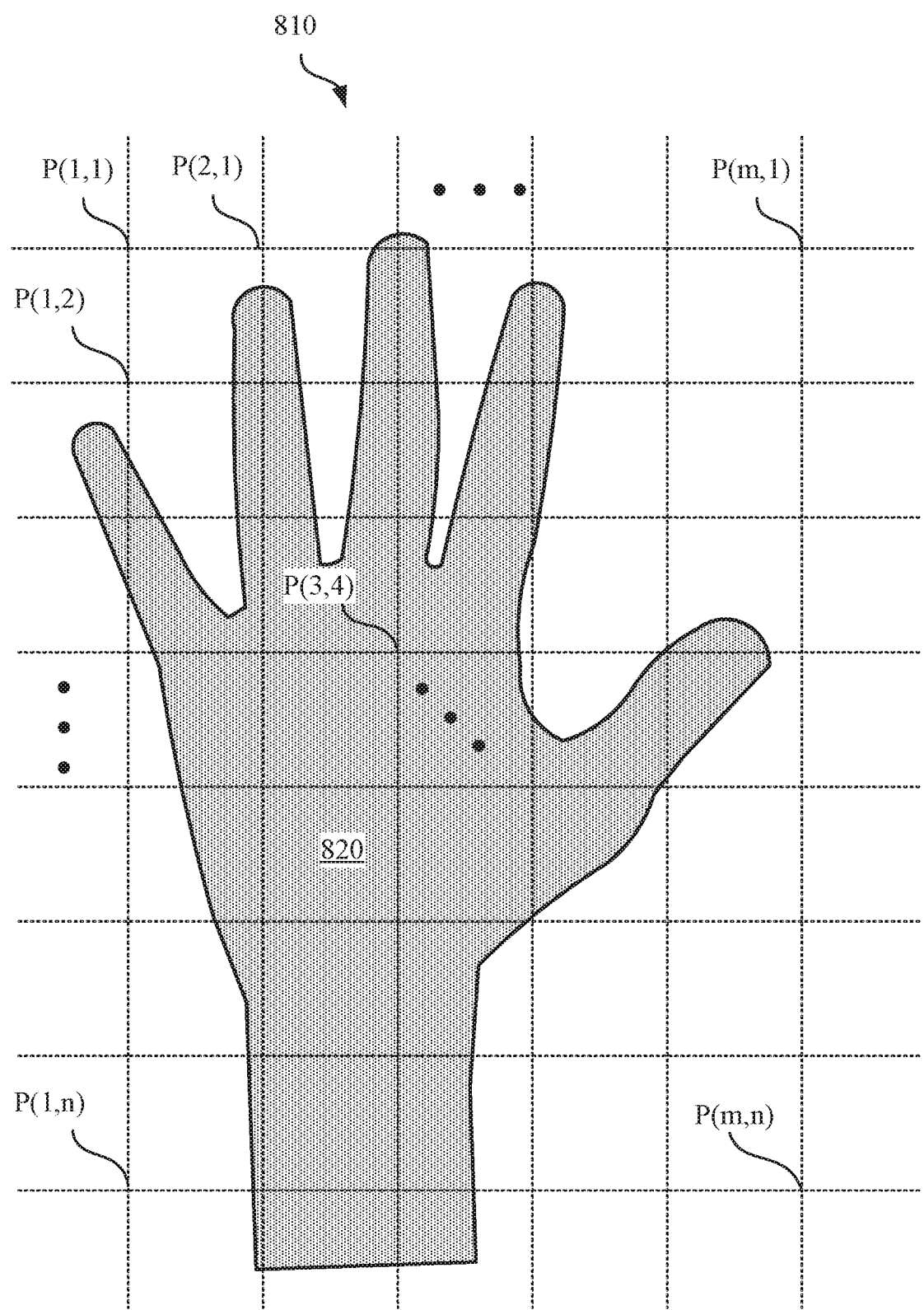
FIG. 8 is a diagram illustrating an exemplary operation of a distance sensor, consistent with some embodiments of the present disclosure.

7. Accordingly, UAV 100 can be aligned with the hand during lowering of the flight altitude under control of FCC 132. Returning to FIG. 6, in step S393, UAV 100 detects the distance between UAV 100 and the hand during lowering of the flight altitude. For further understanding the distance detection in step S393, reference is made to FIG. 8, which is a diagram illustrating an exemplary operation of distance sensor 150, consistent with some embodiments of the present disclosure. In some embodiments, a specular array radiometric calibration (SPARC) method can be applied in distance sensor 150 for calibration. As shown in FIG. 8, distance sensor 150 can produce a matrix of laser beams, sequentially or simultaneously, to detect multiple detection points P(1, 1)P(m, n) in a matrix 810. If one of the detection points (e.g., detection point P(3, 4)) falls within a hand region 820, the corresponding laser beam emitted from distance sensor 150 travels along a direction toward the hand of the user, and reflects back to a detector in distance sensor 150.

Accordingly, the distance between UAV 100 and the hand can be measured using time-of-flight principle as mentioned above. Alternatively, if another one of the detection points (e.g., detection point P(1, 1)) does not fall within hand region 820, the corresponding laser beam emitted from distance sensor 150 is not reflected until reaching other obstacles. Accordingly, distance sensor 150 can scan a detection region and determine which detection point(s) fall within hand region 820 in accordance with time-of-flight of laser beams.

In some embodiments, an allowance value can be determined by calculating a ratio of detection points within hand region 820 in matrix 810 to a total number of detection points, in order to determine whether UAV 100 is positioned above the hand of the user. If the allowance value is greater than a threshold value (e.g., about 50%), it is determined that UAV 100 is positioned above the hand of the user.

Returning to FIG. 6, in step S394, UAV 100 determines whether the detected distance is lower than a threshold value (e.g., about 3 cm). Responsive to a determination that the detected distance is lower than the threshold value (step S394—yes), UAV 100 performs step S395 and turns off motors 110*a*-110*d*. Otherwise (step S394—no), steps S391-S394 are repeated. Accordingly, UAV 100 descends under control, until motors 110*a*-110*d* are turned off in response to the distance between UAV 100 and the hand being lower than the threshold value. When motors 110*a*-110*d* are turned off, propellers 120*a*-120*d* coupled to motors 110*a*-110*d* stop rotating, and UAV 100 falls due to gravity and lands on the hand of the user. Thus, UAV 100 achieves hand landing. In some embodiments, all motors 110*a*-110*d* are turned off to stop propellers 120*a*-120*d* from rotating. In some embodiments, one or some of the motors 110*a*-110*d* are turned off, and propulsion provided to UAV 100 is not sufficient to maintain the hover altitude, so that UAV 100 also descends and lands on the hand of the user due to gravity.

In view of above, in various embodiments of the present disclosure, UAV 100 can detect a user's hand gesture and achieve hand landing by the image recognition and distance detection processes described above. Accordingly, an improved human-machine interaction design is accomplished with intuitive operations.

The various example embodiments herein are described in the general context of method steps or processes, which may be implemented in one aspect by a computer program product, embodied in a transitory or a non-transitory computer-readable medium, including computer-executable instructions, such as program code, executed by computers in networked environments. A computer-readable medium may include removable and nonremovable storage device(s) including, but not limited to, Read Only Memory (ROM), Random Access Memory (RAM), compact discs (CDs), digital versatile discs (DVD), etc. Generally, program modules may include routines, programs, objects, components, data structures, etc., that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the foregoing specification, embodiments have been described with reference to numerous specific details that can vary from implementation to implementation. Certain adaptations and modifications of the described embodiments can be made. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the drawings and specification, there have been disclosed exemplary embodiments. It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

What is claimed is:

1. A non-transitory computer-readable medium storing a set of instructions executable by a processor of an unmanned aerial vehicle to cause the unmanned aerial vehicle to perform a method for landing the unmanned aerial vehicle, the method comprising:

recognizing a first gesture of a hand;

responsive to a recognition of the first gesture, moving the unmanned aerial vehicle to hover above the hand;

detecting a distance between the unmanned aerial vehicle and the hand;

responsive to a determination that the distance falls in a range, monitoring the hand to recognize a second gesture of the hand; and responsive to a recognition of the second gesture, landing the unmanned aerial vehicle on the hand.

2. The non-transitory computer-readable medium of claim 1, wherein landing the unmanned aerial vehicle on the hand further comprises:

lowering a flight altitude of the unmanned aerial vehicle; and aligning the unmanned aerial vehicle to the hand during lowering of the flight altitude.

3. The non-transitory computer-readable medium of claim 2, wherein the monitoring includes monitoring the hand in an image obtained by a camera of the unmanned aerial vehicle, aligning the unmanned aerial vehicle to the hand further comprising:
 identifying a center of the hand in accordance with one or more features of the hand in the image; and
 moving the unmanned aerial vehicle to track the center of the hand in a central region of the image.

4. The non-transitory computer-readable medium of claim 3, wherein identifying the center of the hand further comprises:
 detecting a contour of the hand in the image;
 extracting the contour to obtain a convex hull and a convexity defect including at least one triangle; and
 identifying the center of the hand based on the convex hull and the convexity defect.

5. The non-transitory computer-readable medium of claim 2, wherein landing the unmanned aerial vehicle on the hand further comprises:
 detecting the distance between the unmanned aerial vehicle and the hand during lowering of the flight altitude; and
 responsive to a detection that the distance is lower than a threshold value, turning off one or more motors of the unmanned aerial vehicle.

6. The non-transitory computer-readable medium of claim 1, wherein the monitoring includes monitoring the hand in an image obtained by a camera of the unmanned aerial vehicle, recognizing the second gesture of the hand further comprising:
 detecting a contour of the hand in the image;
 extracting the contour to obtain one or more convexity defects associated with the contour in the image; and
 responsive to a detection that the number of the one or more convexity defects changes, recognizing the second gesture of the hand.

7. The non-transitory computer-readable medium of claim 1, wherein detecting the distance further comprises:
 transmitting a laser beam along a direction toward the hand;
 receiving a reflection of the laser beam; and
 calculating the distance based on a time difference between transmitting the laser beam and receiving the reflection.

8. A method for landing an unmanned aerial vehicle, comprising:
 recognizing a first gesture of a hand;
 responsive to a recognition of the first gesture, moving the unmanned aerial vehicle to hover above the hand;
 detecting a distance between the unmanned aerial vehicle and the hand;
 responsive to a determination that the distance falls in a range, monitoring the hand to recognize a second gesture of the hand; and
 responsive to a recognition of the second gesture, landing the unmanned aerial vehicle on the hand.

9. The method for landing the unmanned aerial vehicle of claim 8, wherein landing the unmanned aerial vehicle on the hand further comprises:
 lowering a flight altitude of the unmanned aerial vehicle; and
 aligning the unmanned aerial vehicle to the hand during lowering of the flight altitude.

10. The method for landing the unmanned aerial vehicle of claim 9, wherein the monitoring includes monitoring the hand in an image obtained by a camera of the unmanned aerial vehicle, aligning the unmanned aerial vehicle to the hand comprises:
 identifying a center of the hand in accordance with one or more features of the hand in the image; and
 moving the unmanned aerial vehicle to track the center of the hand in a central region of the image.

11. The method for landing the unmanned aerial vehicle of claim 10, wherein identifying the center of the hand further comprises:
 detecting a contour of the hand in the image;
 extracting the contour to obtain a convex hull and a convexity defect including at least one triangle; and
 identifying the center of the hand based on the convex hull and the convexity defect.

12. The method for landing the unmanned aerial vehicle of claim 9, wherein landing the unmanned aerial vehicle on the hand further comprises:
 detecting the distance between the unmanned aerial vehicle and the hand during lowering of the flight altitude; and
 responsive to a detection that the distance is lower than a threshold value, turning off one or more motors of the unmanned aerial vehicle.

13. The method for landing the unmanned aerial vehicle of claim 8, wherein the monitoring includes monitoring the hand in an image obtained by a camera of the unmanned aerial vehicle, recognizing the second gesture of the hand comprising:
 detecting a contour of the hand in the image;
 extracting the contour to obtain one or more convexity defects associated with the contour in the image; and
 responsive to a detection that number of the one or more convexity defects changes, determining that the second gesture is recognized.

14. The method for landing the unmanned aerial vehicle of claim 8, wherein detecting the distance further comprises:
 transmitting a laser beam along a direction toward the hand;
 receiving a reflection of the laser beam; and
 calculating the distance based on a time difference between transmitting the laser beam and receiving the reflection.

15. An unmanned aerial vehicle, comprising:
 one or more processors; and
 a memory storing instructions that, when executed by the one or more processors, cause the unmanned aerial vehicle to perform operations comprising:
 recognizing a first gesture of a hand;
 responsive to a recognition of the first gesture, moving the unmanned aerial vehicle to hover above the hand;
 detecting a distance between the unmanned aerial vehicle and the hand;
 responsive to a determination that the distance falls in a range, monitoring the hand to recognize a second gesture of the hand; and
 responsive to a recognition of the second gesture, landing the unmanned aerial vehicle on the hand.

16. The unmanned aerial vehicle of claim 15, wherein landing the unmanned aerial vehicle on the hand further comprises:
 lowering a flight altitude of the unmanned aerial vehicle; and
 aligning the unmanned aerial vehicle to the hand during lowering of the flight altitude.

17. The unmanned aerial vehicle of claim 16, wherein the monitoring includes monitoring the hand in an image obtained by a camera of the unmanned aerial vehicle, aligning the unmanned aerial vehicle to the hand further comprising:

identifying a center of the hand in accordance with one or more features of the hand in the image; and moving the unmanned aerial vehicle to track the center of the hand in a central region of the image.

18. The unmanned aerial vehicle of claim 17, wherein identifying the center of the hand further comprises:

detecting a contour of the hand in the image;

extracting the contour to obtain a convex hull and a convexity defect including at least one triangle; and identifying the center of the hand based on the convex hull and the convexity defect.

19. The unmanned aerial vehicle of claim 16, wherein landing the unmanned aerial vehicle on the hand further comprises:

detecting the distance between the unmanned aerial vehicle and the hand during lowering of the flight altitude; and responsive to a detection that the distance is lower than a threshold value, turning off one or more motors of the unmanned aerial vehicle.

20. The unmanned aerial vehicle of claim 15, wherein the monitoring includes monitoring the hand in an image obtained by a camera of the unmanned aerial vehicle, recognizing the second gesture of the hand further comprising:

detecting a contour of the hand in the image;

extracting the contour to obtain one or more convexity defects associated with the contour in the image; and responsive to a detection that number of the one or more convexity defects changes, recognizing the second gesture of the hand.

21. The unmanned aerial vehicle of claim 15, wherein detecting the distance further comprising:

transmitting a laser beam along a direction toward the hand;

receiving a reflection of the laser beam; and calculating the distance based on a time difference between transmitting the laser beam and receiving the reflection.

\* \* \* \* \*